INVENTOR.
Alfred H. Faulkner
BY
Hugh L. Fisher
ATTORNEY

INVENTOR.
Alfred H. Faulkner
BY
Hugh L. Fisher
ATTORNEY

INVENTOR.
Alfred H. Faulkner
BY
Hugh L. Fisher
ATTORNEY

Nov. 11, 1969 A. H. FAULKNER 3,478,333

MAGNETIC MEMORY SYSTEM

Filed Feb. 24, 1964 4 Sheets-Sheet 4

INVENTOR.
Alfred H. Faulkner

BY Hugh L. Fisher

ATTORNEY

United States Patent Office 3,478,333
Patented Nov. 11, 1969

3,478,333

MAGNETIC MEMORY SYSTEM

Alfred H. Faulkner, Redondo Beach, Calif., assignor to General Motors Corporation, Detroit, Mich., a corporation of Delaware Filed Feb. 24, 1964, Ser. No. 346,707
Int. Cl. G11b 5/12
U.S. Cl. 340—174 10 Claims

ABSTRACT OF THE DISCLOSURE

Memory for digital computers including destructive and nondestructive readout portions sharing certain selection lines. Destructive readout portion is implemented with toroidal cores using coincident-current selection for read and write. Nondestructive readout portion employs multiaperture devices also using coincident current selection for prime and read. One set of selection lines is common to both portions, but performs a distinct function in each to permit discrete selection operation.

SUMMARY OF THE INVENTION

This invention relates to a random access memory system for digital information storage and retrieval and, more particularly, to such a memory system utilizing coincident signal selection techniques to provide access to a fixed information storage portion and a variable information storage portion using selection circuits which are common to both the fixed and variable information storage portions.

Digital memory systems generally include an array of storage elements, each of which is capable of storing either permanently or temporarily an amount of coded digital information. The memory system also includes means for quickly and accurately inserting or "writing" information into the memory system, and for extracting or "reading" the information so stored or to perform a combination operation in a cyclic manner. The storage elements may take one of several forms, and a particularly preferred form is the magnetic core element. Magnetic core elements are characteristically made of a material having a high magnetic remanence, for example, ferrite, such that each element has two stable magnetic states of opposite polarity which are capable of representing different values of digital information. These values or "bits" are designated as "1" and "0." Each of the cores may be switched between the two information states by means of lines linking the elements and carrying current of a net magnitude sufficient to provide a flux field which exceeds the coercive force required to reverse the magnetic flux condition in the element. In a coincident current memory system, each element is linked by two or more lines which carry fractional drive currents, e.g., a two line coincident current system supplies "half-drive" current in each line. The current in either line alone is insufficient to reverse the flux state of the elements; however, the combination of the two or more currents is sufficient to reverse the flux state. Normally such a coincident current system employs a large number of magnetic cores which are assembled in a two-dimensional array and divided into rows and columns of which each row and column is defined by one or more selection lines or conductors. Each of the cores is assigned an "address." Access to the array for inserting or extracting information is provided by a combination of logic and switch means which are responsive to a digital address to energize the combination of a row and column selection line which is calculated to select a single storage element in the array corresponding to the address.

Where the magnetic core element takes the form of a simple toroid having a single aperture, it is apparent that interrogating or reading the core results in a change in the flux condition of the core and a consequent loss or destruction of the information which was stored in the core. Such a readout method is known as destructive readout (DRO). This technique is useable where either means are provided for immediately restoring the information to the core or the memory system is to be used for storing variable information which is often subject to change. Such memories are referred to as "scratch pads."

A nondestructive readout (NDRO) wherein interrogation or reading of the core elements does not destroy the informational content thereof may be implemented by the use of multi-apertured magnetic core elements commonly called "transfluxors." A well-known form of transfluxor has two apertures defining a plurality of inter-related flux paths which may be used for storing digital information. One of the apertures is used for writing information into the core, and the other aperture is used for nondestructively reading the information from the core. The reading process is a two-step operation requiring a sequence of signals which shall be referred to as "prime" and "read" signals. In a coincident current system using double coincidence, each of the prime and read processes require a coincidence of two signals. As above, an NDRO memory system employing multi-apertured magnetic core elements may include one or more two-dimensional arrays of elements which are separated into rows and columns defined by row and column selection lines. In the case of a double coincident system it may be seen that row and column selection lines must be provided for each of the prime and read operations. Alternatively, means may be provided for reversing the direction of current through a single pair of row and column lines between operations. However, this latter alternative generally requires switching equipment of greater complexity.

The present invention provides a memory system employing coincident signal selection techniques which advantageously and expeditiously combines the NDRO and DRO type operations such that the memory includes a fixed information portion and a variable information portion to which access is provided by means of selection circuits which are common to both portions of the memory. In general, the fixed or NDRO portion of the memory includes a two-dimensional array of first magnetic storage elements containing digital information which may be read therefrom in a nondestructive fashion, and the variable or DRO portion includes a two-dimensional array of second magnetic storage elements containing digital information which may be read therefrom in a destructive fashion. Access to the fixed and variable portions of the memory is provided in such a fashion as allows exclusive and selective access to the portions by means of a first plurality of column selection lines individually linking the columns of the first magnetic core elements and a second plurality of column selection lines individually linking columns of the second magnetic storage elements. In addition, a plurality of row selection lines which commonly link individual rows of both the first and second magnetic storage elements is provided. The combination further includes means for receiving a digital address which defines both the array, either NDRO or DRO, to be selected and the particular core within the array. Means are provided for decoding the address and for coincidently energizing a combination of row and column selection lines in one of the arrays to thereby provide access to that storage element which is linked by the coincidently energized lines.

In a preferred form, the two-dimensional array of NDRO storage elements may be made up of transfluxors having two apertures defining a plurality of inter-related flux paths which may be interrogated or read by a sequence of first and second pairs of signals referred to as "prime" and "read" signals. The DRO portion of the memory may be implemented by means of simple toroidal elements, which may be interrogated by a single pair of coincident signals. Briefly describing the preferred embodiment of the invention, a fixed information storage portion is provided by means of a first two-dimensional array of first magnetic storage elements containing digital information which may be nondestructively read by a sequence of two coincident prime signals and two coincident read signals. The variable portion of the memory comprises a two-dimensional array of second magnetic core elements, also containing digital information which may be destructively read by a pair of coincident read signals. To provide access to the first magnetic core elements, each column of core elements is linked by one of a plurality of column prime lines which are used to supply one of the pair of coincident prime signals to the selected core elements. In addition, each column of core elements in the first array is linked by one of a plurality of column read lines which are used to supply, at a later time, one of the pair of coincident read signals to the selected core elements. To complete the coincident current requirements for the first or prime pair of coincident signals, each row of core elements is linked by one of a plurality of row prime lines which are used to supply the other of the coincident pair of prime signals to the selected elements. It is to be noted, however, that the row selection lines in this first plurality of row selection lines, in addition to linking the first magnetic core elements, also links the second magnetic core elements for providing one of the pair of coincident read signals thereto. The system, insofar as fixed storage portion read operations are concerned, is completed by provision of a plurality of row read lines linking the first magnetic core elements for providing the other of the second or read signals thereto. The access to the DRO or variable information storage section is completed by means of a plurality of column read lines linking individual columns of second magnetic storage elements for providing the other of the coincident read signals to the DRO cores. In cooperative relation with the selection lines described above, a logic selection system is provided for responding to an address in coded form by energizing the combination of row and column lines required to read information from a core in either the fixed or variable portions of the memory.

For the description of the invention given above, it may be seen that for purposes of reading the various portions of the memory system, each of the fixed and variable portions is provided with column selection lines which are exclusive to their own individual portions. The row selection lines may, however, link the storage elements of both the fixed and variable portions. Since the system operates on coincident current techniques, no storage element is selected unless a full drive is received in the form of half-drive signals from both column and row selection lines. More specifically, the row selection lines which link the rows of cores in both portions, when energized, provide a half-drive for priming the fixed portion cores and for reading the variable portion cores. Therefore, both prime and read operations in the fixed portion of the memory may be carried on in the proper sequence without affecting the information stored in any of the variable portion cores, since only one-half of the required drive current to the variable portion cores is provided. The read operation in the variable portion of the memory may be carried on using a common row selection line and an exclusive column selection line to provide full drive. Since no column selection prime line in the fixed portion is energized, the read operation in the variable portion does not affect any of the cores in the fixed portion. Thus, mutually exclusive operations may be carried on in the fixed and variable storage portions of the memory with a great savings in drive circuit complexity.

In accordance with the invention, a capacity for writing or restoring information to the variable portion of the memory after reading may be accomplished by the addition to the combination described of an additional set of column selection write or restore lines to the variable portion and by linking both fixed and variable portions with the read selection lines of the fixed portion. Thus, each core in the fixed portion of the memory is linked by a column prime line and a column read line, both of which are peculiar to the fixed portion of the memory. In addition, each variable portion core is linked by a row line which is used to prime the fixed core and to read the variable core also linked thereby. In addition, each fixed portion core is linked by a second row line which is used to supply the second read signal to the fixed core, and also to provide one of the pair of write or restore signals to the variable portion core linked thereby. Each core in the variable portion of the memory is linked by a column read line and a column write line, both of which are peculiar to the variable portion. In addition, each core is linked by a row read line and a row write line, both of which extend through the fixed portion cores as well as the variable portion cores. From the foregoing, it can be seen that each of the row lines has two separate functions. One set of row lines is used to prime the fixed portion cores and read the variable portion cores. The other set of row lines is used to read the fixed portion cores and write into the variable portion cores. Accordingly, both prime and read operations may be performed on a fixed portion core without affecting the information in the variable portion core which is linked by the same row lines. This is possible since neither of the read or write column lines of the variable core are energized. It is further possible to both read and write into a variable portion core without affecting the information stored in the fixed portion core which is linked by the same row lines. This is possible since, according to the address, none of the column prime lines of the fixed core are energized.

In a particular embodiment of the invention, the row and column selection lines may be energized by means of addressable switch means which, upon receipt of the proper combination of input signals, connect the associated lines to a source of direct current. According to the preferred embodiment, the address is decoded and applied either to a combination of switch means in the fixed portion of the memory which performs a prime operation on a particular core, or to a combination of switch means in the variable portion of the memory which performs a read operation on a particular core. In addition, logic means are provided for selecting, after energization of the first combination in the fixed portion, for example, a second combination of switch means distinct from the first combination for performing a read operation on the same core which was primed by the first combination of switches. In addition, the logic means is effective, assuming a combination of DRO switch means was selected, to select a second combination of switch means to write or restore information to the same DRO core as was read. In general, this is accomplished by means of a logic circuit which is effective to toggle the switch means in the particular portions of the memory addressed. Such toggling has the advantage of lowering the duty cycle of each of the switches by assuring that the same switch is never actuated in two successive periods of memory operation. This feature provides additional lattitude in the particular type of switch which may be employed in the individual switch means.

In accordance with the present invention, the capacity of the invention may be readily expanded by the provision of a plurality of the two-dimensional arrays described above in both the fixed and variable portions of the memory. Both the row and column selection lines of each portion employing a plurality of such arrays may be continuously threaded through the arrays such that energization of a particular combination of selection lines, as briefly described above, is effective to perform the prime read or write operations on a number of cores corresponding to the number of arrays employed.

The invention, as well as the construction and operation thereof, may be better understood by reference to the following description of a specific embodiment thereof which is to be taken with the accompanying drawings of which:

FIGURE 1

Figure 1:
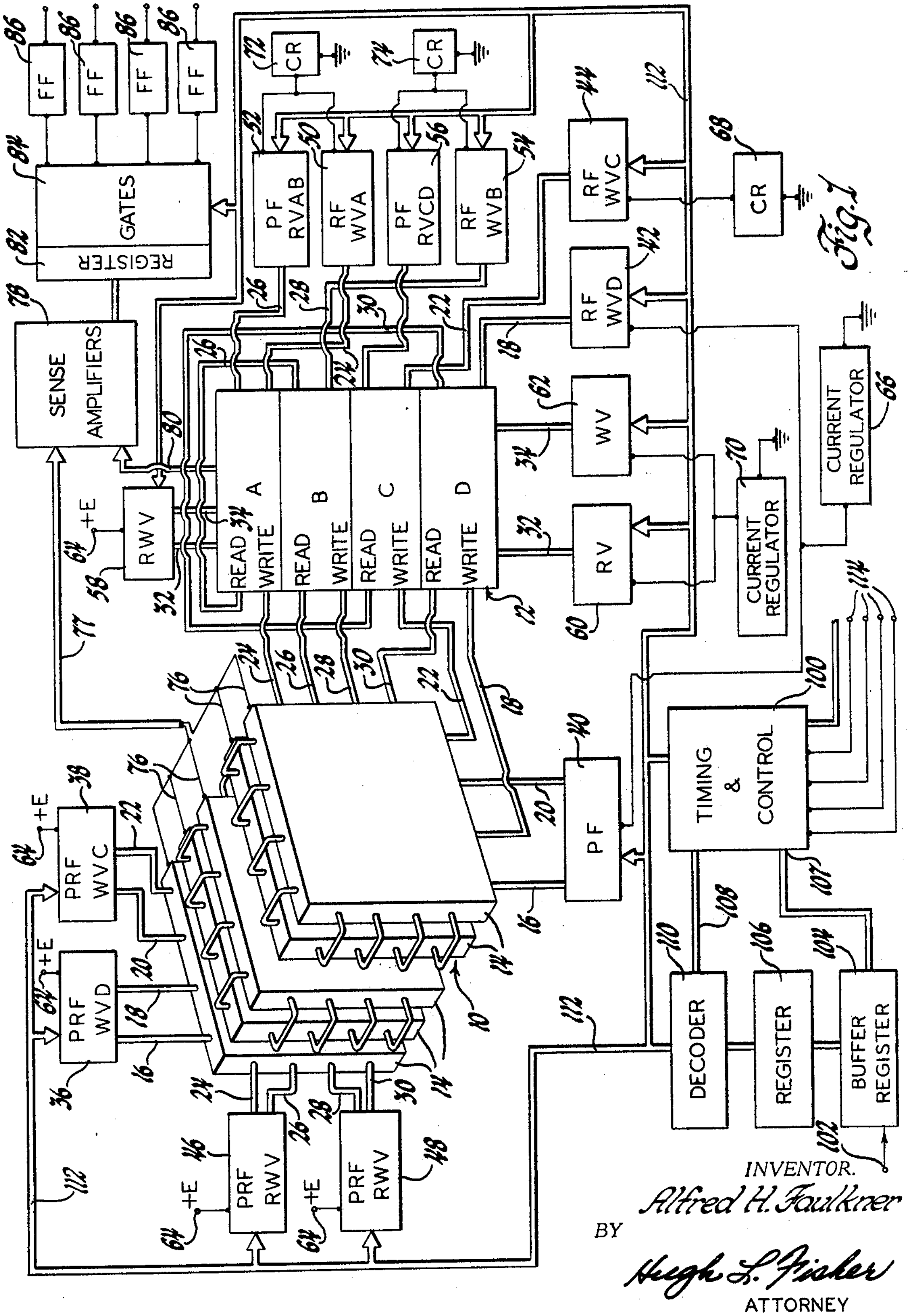
FIGURE 1 is a block diagram of a memory system having both fixed and variable information storage portions.

Referring now to FIGURE 1, there is shown a digital memory system having a fixed information storage portion 10 and a variable information storage portion 12, known as a "scratch pad," access to both of which is gained by means of a double coincidence of selection signals. The fixed storage portion 10 is, more specifically, shown to be made up of a plurality of similar planes 14, each of which is representative to a two-dimensional array of magnetic core elements containing digital information which may be nondestructively read by means of a sequence of first and second pairs of coincident signals which, for purposes of discussion, shall be referred to as "prime" and "read" signals, respectively. The particular type of magnetic core elements used in the fixed information storage section 12 is shown in FIGURE 2.

Figure 4:
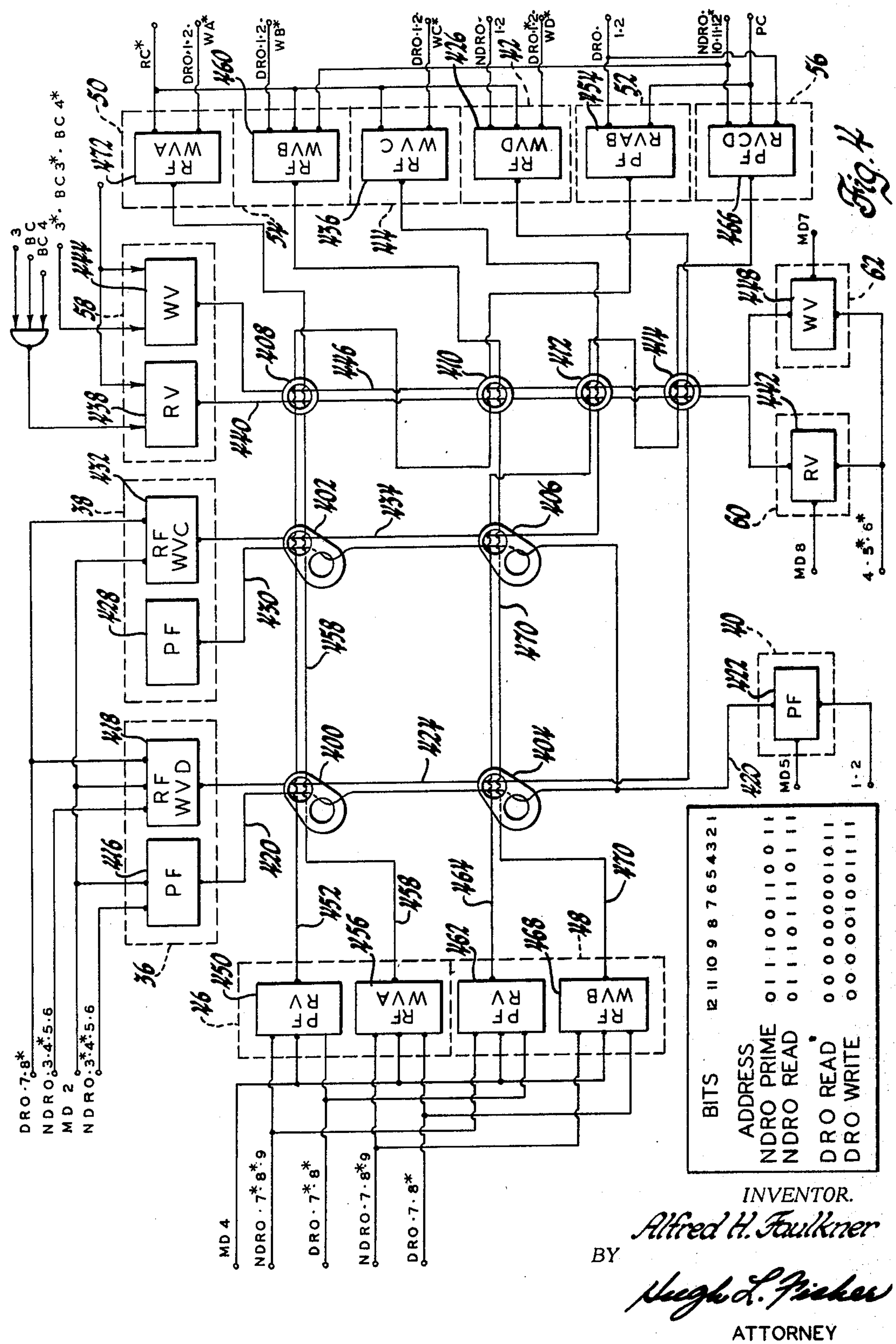
FIGURE 4 is a diagram partly in schematic detail of a portion of both the fixed and variable portions of the memory system shown in FIGURE 1.

The variable information storage portion 12 is shown to include four planar portions A, B, C and D, each of which represents a two-dimensional array of toroidal magnetic core elements, such as is better shown in FIGURE 4, containing digital information which may be destructively read therefrom by means of a pair of coincident read signals and to which digital information may be added or restored by means of a pair of coincident write signals.

The process of retrieving or reading information from the fixed portion 10 of the memory system is accomplished by means of various groups of selection lines, including those indicated at 16, 18, 20 and 22. The lines are manifold and are, thus, shown as cables for the sake of convenience. As indicated, the lines 16, 18, 20 and 22 are arranged to link individual columns of the planes 14 of core elements in a continuous fashion. As will become more apparent in the following, the lines in cables 16 and 20 are representative of prime lines which link individual columns of storage elements in each of the two-dimensional planes 14 in such a fashion that each column of storage elements is linked by one column prime line. Similarly, cables 18 and 22 are representative of column read lines which individually link the columns of the two-dimensional planes 14 of the fixed portion 10 such that each column of storage elements is linked by one column read line. Thus, each of the storage elements in the planes 14 is linked by a column prime and a column read line which are used to supply half of the required prime and read signals. The other half of each of the prime and read signals is supplied by means of row selection lines shown as cables 24, 26, 28 and 30. Each of the rows of storage elements in the planar arrays 14 is linked by a row prime line in either cable 26 or 30. In addition, each of the rows of storage elements in the planar array 14 is linked by one of the read lines in either cable 24 or 28. In summary, each core in each of the planar arrays 14 is linked by column and row prime lines and by column and row read lines. It should be noted that while the embodiment of FIGURE 1 employs a plurality of two-dimensional arrays 14 as well as apportioning or segmenting of the arrays by use of a plurality of drive line sections, these are extensions of a basic system employing a single array which is unsegmented.

Access to the variable portion 12 of the memory system is also provided by a combination of column and row selection lines. Each of the columns of storage elements in each of the two-dimensional arrays A, B, C and D is linked by one of a plurality of column read lines shown as a cable 32. In addition, each of the columns of storage elements is linked by one of a plurality of column write lines shown as a cable 34. Thus, each storage element is linked by a column read line and write line which supplies one-half of the necessary drive to perform the respective functions of reading and writing. The other half of the drive is obtained from row selection lines which are assigned to each of the arrays A, B, C and D of the variable information storage portion 12. These row selection lines are extensions of various selection lines from the fixed information storage portion as shown. Specifically, each of the rows of elements in the A array is linked by a row read line in cable 26 and a row write line in cable 24. Each of the rows of elements in the B array is linked by a row read line in cable 26 and a row write line in cable 28. Similarly, the C array is linked by row read lines from cable 30 and row write lines from cable 22, and the D array is linked by row read lines from cable 30 and row write lines from cable 18. In summary, every storage element in the variable storage portion 12 is linked by a row and column read line and a row and column write line.

At this point, it is apparent that all of the row selection lines of the fixed portion 10 and also some of the column selection lines serve a row selection function in the variable portion 12. Specifically, the prime lines in cables 26 and 30 serve to perform a row read function in the variable portion arrays A, B, and C, D, respectively. The read lines in cables 18, 22, 24 and 28 serve to perform row write functions in the variable storage arrays D, C, A and B, respectively. Since both column read and write lines for the variable portion 12 are exclusive thereto, independence of operation is maintained as between the fixed and variable portions 10 and 12.

As suggested above, the storage elements of the memory system take the form of magnetic core elements which are read by coincident current techniques. To supply the direct current for driving the cores, each of the selection lines shown in FIGURE 1 is connected on each end to a switch which may be closed upon receipt of the proper input signals to direct current from a source to the selection line. The use of a switch at each end of the line is suggested, of course, so that each switch may be connected to a plurality of lines in a logical fashion allowing for exclusive line selection by closing of two switches, to thereby minimize the number of switches required, as will be apparent to those skilled in the art.

Specifically, the selection lines in cables 16 and 18 are connected on one side to switches in a group of switches designated at 36. Similarly, the selection lines in cables 20 and 22 are connected on one side to switches in a switch group 38. The other end of the lines in cables 16 and 20 are terminated at switches in a switch group 40 while lines in cables 18 and 22 are terminated at switch groups 42 and 44, respectively. The row selection lines of cables 24 and 26 are connected on one side to switches in group 46 while cables 28 and 30 are connected to group 48. The cables 24, 26, 28 and 30 are terminated at switch groups 50, 52, 54 and 56, respectively. Finally, the column read lines of cable 32 are connected between switches in groups 58 and 60 and the column write lines of cable 34 are connected between switch groups 58 and 62.

All of the switch groups 36, 38, 40, 42, 44, 46, 48, 50, 52, 54, 56, 58, 60 and 62 shown in FIGURE 1, have legends thereon which designate the functions performed by the switches in these groups. The letters on the upper line of the legends designate which of the prime (P) and read (R) functions that are performed with respect to the fixed (F) portion 10 while the letters in the lower line of the legends designate which of the read (R) and write (W) functions is performed with respect to the variable (V) memory portion 12 as well as the particular arrays A, B, C or D upon which that function is performed. As further suggested on the drawings, each of the switches in the groups 36, 38, 46, 48 and 58 is connected to a direct current source as indicated at 64. To complete the current paths partially defined by the source, switches and selection lines, the switches in switch groups 40 and 42 are grounded through a current regulator 66 which assures that the half-drive current through the associated selection lines is properly maintained. Switch group 44 is connected to ground through a second current regulator 68, and groups 60 and 62 are grounded through a third current regulator 70. Switch groups 50 and 52 are connected to ground by means of a fourth current regulator 72, and switch groups 54 and 56 are connected to ground to a fifth current regulator 74.

For the purpose of collecting the digital information from the memory, each of the planes 14 in the variable information storage portion 10 has associated therewith one of a plurality of output or "sense" lines, 76. Although not schematically shown in FIGURE 1 it is to be understood that each sense line links all of the storage elements in the associated plane. Thus, when a "1" is read from the storage element which is selected in each of the arrays 14, a voltage pulse is induced in whichever of the sense lines 76 links the storage element to indicate the value of information read. The sense lines 76 are connected via cable 77 to a block 78 of sense amplifiers. In a similar fashion, each of the arrays A, B, C and D of the variable portion 12 of the memory has associated therewith an individual sense line. These sense lines are connected via a cable 80 to the sense amplifier block 78. The outputs of the sense amplifiers are connected to the input of a register 82, the output of which is gated through gates 84 four bits at a time to the inputs of four parallel connected flip-flops 86.

The gating operation of the gates 84 as well as the selection and energization of the various switches in the switch groups shown in FIGURE 1 is dependent upon signals which are received from a timing and control unit 100, which contains a clock such that the switches are actuated at the clock rate. In addition, the switches in the switch groups are also controlled by means of an input in the form of a digital address which appears on an input terminal 102. The address is serially entered into an address buffer register 104. After the complete address has been entered, it is shifted in parallel into the address register 106. Simultaneously, the address is gated into an input 107 of the timing and control unit 100 where a predetermined portion of the address operates as an exchange code to identify the particular portion, either fixed or variable, to be accessed. The address, after being operated upon by logic means contained in the address register 106 is transferred in parallel to a decoder 110 which also receives timing and address modifying signals on a parallel input link 108 from the timing unit 100. The decoder is connected via a cable 112 to each of the switch groups shown in FIGURE 1. The timing and control unit of the memory system also receives data which may be written into the variable portion 12 of the memory on a plurality of input lines 114.

Generally describing the operation of the memory system shown in FIGURE 1 and assuming the presence of information in both the fixed and variable portions 10 and 12 of the memory, a digital address is serially transferred into the address buffer register 104 from an external information source such as a computer at a prescribed rate. The address may, for example, consist of twelve bits, the four most significant of which are used to determine which portion of the memory is to be selected. The twelve bits of the address are then transferred from the address register 106 to the decoder 110. The decoder is responsive to the particular address to provide input signals to a predetermined combination of the switches in the groups shown in FIGURE 1. In addition, the timing and control unit 100 furnishes a sequence of timing pulses to the switch groups as well as the gates 84 such that each of the selected switches is operated at a predetermined time. If the address designates a location in the fixed portion 10 of the memory, the two-step read operation commences with the prime step. One of the switches in each of groups 38 and 40, for example, is supplied with input signals such that current from source 64 is steered through one of the column prime lines in cable 20. Current flows from source 64 through the switch which is selected in group 38, through the line which is selected in cable 20, through a switch selected in group 40, and through the current regulator 66 to ground. This supplies one of the required two units of prime current to a storage core in each of the planar arrays 14 of the memory system. The second unit of prime current may be received from source 64 by simultaneous energization of a switch in each of groups 46 and 52, for example. Such energization of prime switches in groups 40 and 52 allows current to pass through a row prime line in cable 26 which links all of the two-dimensional arrays 14 of the fixed memory portion 10 as well as the B and A arrays of the variable portion 12. The current path is completed through current regulator 72 to ground. At this point, one core in each of the two-dimensional arrays 14 is primed for reading. The current through the line in cable 26, which links the variable sections A and B, has no effect on the storage elements therein since no column line is energized in the variable portion 12. At this point, the address register 106 through logic circuitry to be described in the following modifies the address slightly to present to the decoders 110 signals which will energize a second combination of switches to complete the two-step read operation on the selected cores. Accordingly, a read current path linking the same columns of storage elements as were linked by the prime line previously energized is completed through a switch in group 38, a line in the cable 22, a switch in group 44 and, thence, to ground through current regulator 68. This supplies half of the required read current to the core selected in each of the arrays 14. The second required coincident read current is supplied from source 64 through a switch in group 46, a line in cable 24 which coincides with that prime line in cable 26 which was previously energized, through the A array of the variable portion 12, through a switch from group 50 and, thence, to ground through the current regulator 72. Therefore, two units of read current are coincident at the previously primed core in each of the two-dimensional arrays 14, and the contents of those cores are read out on the plurality of sense lines 76 and into the register 82 through the amplifiers in block 78. During both of the prime and read portions, various cores in the two-dimensional arrays of the variable portion 12 receive one unit of coincident current. However, since no column through the variable portion 12 is energized during an NDRO or fixed portion operation, the information in the variable portion 12 is undisturbed.

For a second example of operation, assume that the address on input 102 is such that a DRO operation, that is, access to a storage element in the variable portion 12, is commanded. The decoder 110, along with the timing and control unit 100 supplies appropriate energizing signals to the switch groups shown in FIGURE 1 to initiate this operation. For example, one of the switches in groups 58 and 60 receives energizing input signals to complete a current path through one of the column read lines linking all of the arrays A, B, C and D of the variable portion 12. At the same time, a switch in each of groups 46 and 52 is selected, thus, completing a current path through a row read line in cable 26 linking a row of storage elements in both arrays B and A. At the same time, a switch in each of groups 48 and 56 is closed to complete a current path through a row selection line in cable 30 linking the D and C arrays. This combination of read currents through column and row read lines reads out the contents of four cores in the variable portion 12, one core in each of the arrays A, B, C and D. The contents of these four cores are collected on the four sense lines in cable 80, amplified by sense amplifiers at 78 and gated through register 82 and gates 84 into the flip-flops 86. Although the read operation described above requires energization of row prime lines in the fixed portion 10, no column prime lines therein are energized and, thus, no fixed information cores are primed.

At this point, the information in four of the variable portion storage elements has been destroyed, unless, of course, zeros were stored in which case the cores are in the same condition after readout as before. Either more current information appearing at input terminals 114 may be written into these cores, or the same information as has been read out can be restored, depending on the particular operation which the memory is commanded to perform. In any event, address register 108 is effective, upon the termination of the read portion of the DRO cycle, to modify the address slightly and present to decoder 110 signals which will energize write lines through the four cores which have just previously been read. Accordingly, a new switch in group 58 is selected, along with a switch in group 62. This completes a column write current path through each of the arrays A, B, C and D. It is to be understood that this current path goes through the four cores which have been read. At the same time, assuming four "1's" are to be written, the address selects a new switch in each of the groups 46 and 48, as well as a switch in each of groups 36, 38, 50, 54, 42 and 44. Thus, the switch which is selected from group 46 completes a current path through a line in cable 24 which passes through array A, a switch in group 50 and current regulator 72, to ground. At the same time, a switch in group 48 completes a current path through a line in cable 28 which passes through the B array, a switch in group 54, and then through current regulator 74, to ground. Simultaneously with the above operation, a switch in each of groups 38 and 44 selects for energization a line in cable 22 which links a row in the C array. At the same time, a switch in each of groups 36 and 42 selects for energization a line in cable 18 which links the D array of the variable portion 12. This operation, thus, restores or writes information back into the four cores of the arrays A, B, C and D, which have just previously been read out. During this operation, it can be seen that, since lines in cables 18 and 24, as well as 22 and 28, are energized, a coincidence of current appears at as many as four cores in each of the two-dimensional arrays 14 in the fixed portion 10. Such a coincidence of current, however, has no effect upon the storage elements of the fixed portion 10 since each write line in the variable portion is a read line in the fixed portion. Therefore, a coincidence of read currents occur only in unprimed cores in the fixed portion. As will subsequently be made more apparent, the coincidence of read currents through an unprimed core has no effect whatsoever on the core.

FIGURE 2

As previously stated, the variable portion 12 of the memory employs for storage elements single aperture toroidal type cores which are well-known in the art. The fixed portion 10 of the memory employs for storage elements multi-apertured cores 200 which are shown in FIGURE 2. The cores 200 are made of a material exhibiting a substantially square loop hysteresis characteristic such as ferrite. Each of the cores 200 has formed therein a read aperture 202 and a write aperture 204 which together define a major flux path 206 encircling both of the apertures 202 and 204, a minor flux path 208 encircling aperture 202 and a second minor flux path 210 encircling aperture 204. Magnetic core elements of the particular configuration shown in FIGURE 2 are available from Electronic Memories Incorporated, of Hawthorne, Calif. Information may be written into the core 200 by means of direct current carrying lines threaded through the write aperture 204. The write arrangement may be a double or triple coincident current system employing an inhibit line for writing "0's" into the core. Since many techniques for entering information into the system are well known to those skilled in the art, no particular circuit is indicated in FIGURE 2.

Figures 2A, 2B, 2C, 2D:
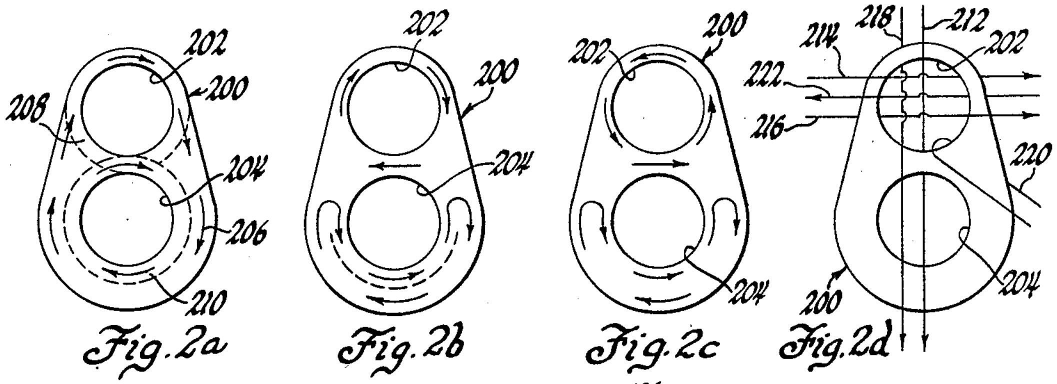
FIGURES 2a to 2d illustrate a particular type of core which is suitable for the fixed portion of the memory system as well as the flux patterns and readout circuits for the cores.

FIGURE 2*a* shows the flux pattern within the core 200 for the "stored zero," "prime zero" and "read zero" conditions. As indicated by the use of this single figure for all three conditions, the prime and read operations do not change the residual flux condition of a core storing a "0." In each case, the flux around the major path 206 is clockwise in direction as is the flux around the minor path 210. It is to be noted that the direction of flux in the bridge portion of the core 200 between the apertures 202 and 204 is in the right-hand or clockwise direction.

To store a "1" in a core 200 which is preliminarily in the flux condition shown in FIGURE 2*a*, current is passed through one or more windings in the write aperture 204 in such a polarity as to reverse the direction of flux around the minor flux path 210. This has the effect of doubling back the flux in the lower portion of the major path 206 as indicated by the arrows in FIGURE 2*b*. It is also to be particularly noted that the direction of flux in the bridge portion between the apertures 202 and 204 is switched from right to left as shown in the drawing. FIGURE 2*b*, thus, represents the "stored '1' " condition.

FIGURE 2*c* represents the flux conditions when core 200 is in the "primed '1' " condition. This is accomplished by passing current through a line threading the read aperture 202 in such a direction as to reverse the flux about the minor path 208. Note particularly the direction of the arrow in the portion of core 200 between apertures 200 and 204.

The prime and read operations are performed on the core 200 by means of the combination of linking lines shown in FIGURE 2*d*. For priming purposes, a first prime line 212 is threaded through both apertures 202 and 204 in opposite directions as shown. The second prime signal is received on line 214 which links the read aperture 202 as shown. The read currents are directed through the aperture 202 by means of lines 216 and 218 which are threaded through apertures 202 in a direction opposite to that of the prime lines 212 and 214. In addition, a sense line 220 is threaded through the read aperture 202 thereby to link the minor flux path 208 as shown. With current flow defined by the arrowheads in FIGURE 2*d*, it is observed that the prime currents have a magnetic effect opposite to that of the read currents.

Priming a core 200 which has a "1" stored therein requires a coincidence of current on the two prime lines 212 and 214. The effect of currents on these lines is to reverse the direction of flux around paths 208 from the clockwise condition shown in FIGURE 2*b* to the counterclockwise condition shown in FIGURE 2*c*. It should be noted that the priming operation has no effect on the nature of the flux path in the lower portion of the main path 206 and the minor path 210. Thus, upon occurrence of coincident currents in the read lines 218 and 216, the flux about the read aperture 202 may be reversed to once again assume the condition shown in the stored "1" and read "1" example of FIGURE 2*b*. If a core 200 is storing a "0," the current in the prime line 214 produces a field in the core 200 opposite in direction to the flux in the major flux path 206 but of insufficient force to affect this flux. Line 212 does not link path 206. In addition, the flux cannot take the minor loop 208 inasmuch as the flux in the bridge portion between the two apertures 202 and 204 is already in the direction assumed by a stored "0" and, therefore, it is an open circuit to the flux. Similarly, the effect of a read current is merely to tend to produce a flux in the same direction as that already established as shown in FIGURE 2*a* and, therefore, read currents produce no output voltage.

To assure that an excessive prime drive current does not unblock or put the core 200 into the stored "1" state, the prime line 212 is threaded through both the read and write apertures in such a manner as to cancel the magnetic field developed around the major path 206 which links both apertures 202 and 204. This arrangement makes spurious unblocking virtually impossible by increasing the maximum permissible prime drive by a significant factor.

Also threaded through the read aperture 202 of core 200 is a bias winding 222. The bias winding is threaded throughout each of the planes in the fixed portion 10 of the memory system and carries a DC current in the direction indicated in FIGURE 2*d*. As suggested by the arrowheads, the bias opposes the prime drive on lines 212 and 214 but aids the read drive on lines 216 and 218. This provides a "bash" read operation, whereby a current which is much larger than the required full select current is obtained. This results in large amplitude read signals and also has the advantage of setting each of the cores 200 on a major hysteresis loop at each read operation, thus, improving the system signal-to-noise ratio and core stability.

FIGURE 3

Figure 3:
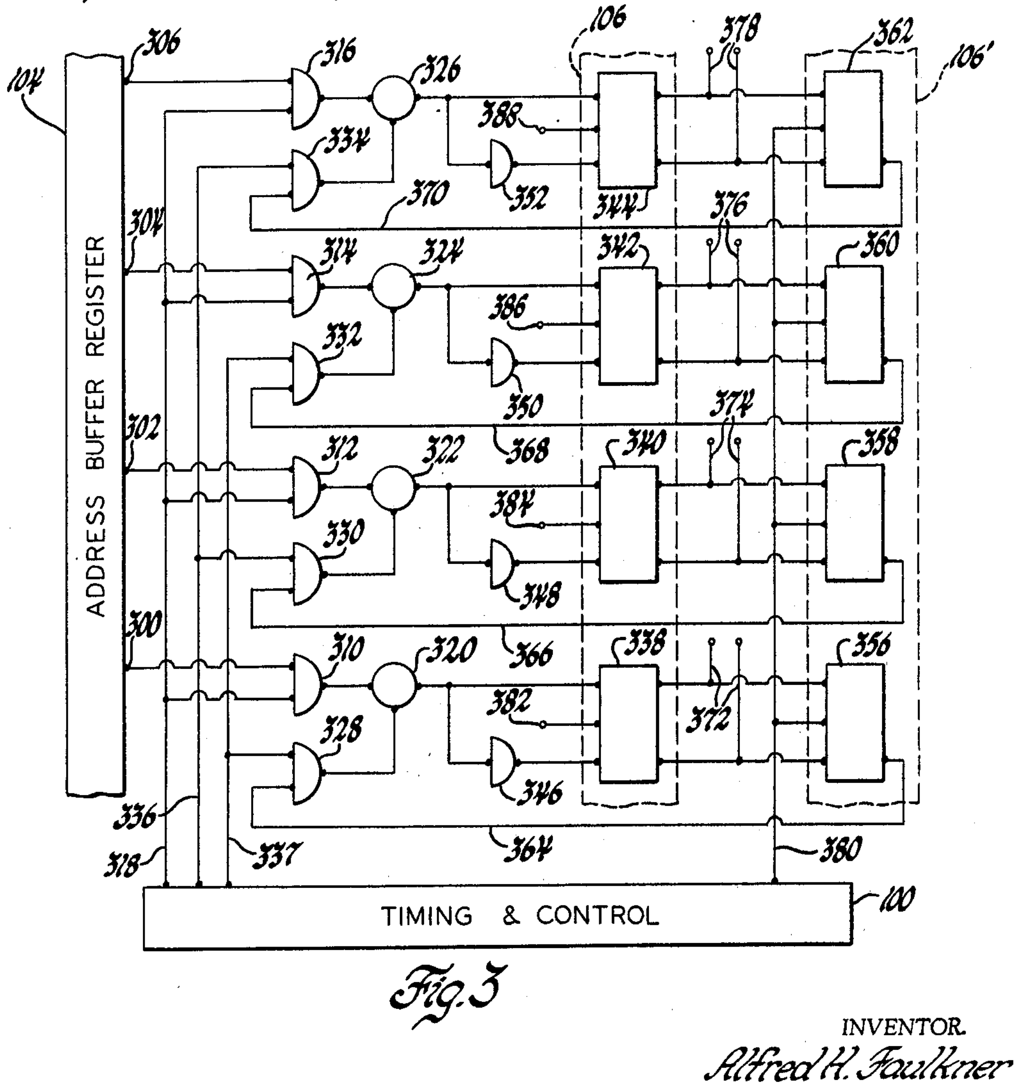
FIGURE 3 is a circuit diagram partly in schematic detail of a portion of the input and logic circuits which may be used in implementing the particular embodiment of the invention shown in FIGURE 1.

It was stated in connection with the general description of operation of the memory system of FIGURE 1 that the sequential prime-read and read-write operations of the fixed and variable portions respectively are accomplished by logic means operable to modify the address received so as to select new switches in a toggling fashion to thereby direct the read or write currents through the either primed or read cores. A circuit for accomplishing this is shown in FIGURE 3. The figure shows a portion of the address buffer register 104 of FIGURE 1 having points 300, 302, 304 and 306 corresponding to certain bits of the address connected to one input of a plurality of inverting selection AND gates 310, 312, 314 and 316. Assuming a twelve-bit address, the output points 300, 302, 304 and 306 correspond to the first, third, fourth and seventh address bits for reasons to be described in a subsequent portion of this text. A second input to each of the gates 310, 312, 314 and 316 is received in line 318 from the timing and control unit 100 also of FIGURE 1.

The output of the gates 310, 312, 314 and 316 is connected as the first input of a plurality of OR gates 320, 322, 324 and 326, respectively. The second input to each of the OR gates 320, 322, 324, and 326, is received from the outputs of a second plurality of AND gates 328, 330, 332 and 334, of which gates 330 and 334 have one input connected to a line 336 which receives signals from the timing and control unit 100. Gates 328 and 332 are connected to unit 100 via line 337. The output of each of the OR gates is connected via two paths into a portion of register 106 including register units 338, 340, 342 and 344. Specifically, the output of gate 320 is connected directly to one input of register unit 338 and via a polarity inverter circuit 346 to another input. A third input is connected to receive a signal later described. Similarly, the outputs of gates 322, 324 and 326 are directly connected to one input of the units 340, 342 and 344, respectively, and to another input thereof via inverter circuits 348, 350 and 352. A third input of each of the units 340, 342 and 344 is connected to receive a logic signal later described. The outputs of registor 106 are connected to the second rank portion 106′ of register 106 containing register units 356, 358, 360 and 362, which always contain the present address. The output of each of the units 356, 358, 360 and 362, is connected back to the other input of each of the AND gates 328, 330, 332 and 334, respectively, via lines 364, 366, 368 and 370. In addition, the outputs of the register units 338, 340, 342 and 344 are connected into the decoder bank 110 of FIGURE 1 via lines 372, 374, 376 and 378, respectively. Finally, even digit time pulses are provided to the second rank register units 356, 358, 360 and 362 via line 380 for gating purposes.

The circuit of FIGURE 3 is responsive to the presence of a digital address to present signals to the decoder bank 110 which select the particular switches for operation in the fixed and variable memory access systems and then to toggle the switches by modifying the address through a logical arrangement of timing signals, as is later described with reference to a specific mode or operation.

FIGURE 4

The following description of the portion of the memory system shown in FIGURE 4 illustrates more clearly how the cores in both the fixed portion 10 and the variable portion 12 are linked with the various row and column selection lines, and further how these lines are selected by the switches in the groups shown in FIGURE 1.

Describing the circuit of FIGURE 4, a segment of the fixed information storage portion 10 is represented by cores 400, 402, 404 and 406. A portion of the variable information storage portion 12 of FIGURE 1 is represented in FIGURE 4 by four single aperture cores 408, 410, 412 and 414, respectively selected from the A, B, C and D arrays of FIGURE 1. For the purpose of providing the selection currents to the cores in the fixed portion of the storage system, the switch group 36 is shown to comprise a pair of switches 416 and 418. Switch 416 is connected to a column prime line 420 which links the read and write apertures of cores 400 and 404 and is connected through a switch 422 which is included in switch group 40 shown in FIGURE 1. Switch 418 has connected thereto a column read line 424 which links the read apertures of both of the cores 400 and 404 as well as the aperture of core 414 of the variable portion of the array. Line 424 is then terminated at a switch 426 which represents a portion of the swich group 42 shown in FIGURE 1. The column prime and read drive components for cores 402 and 406 are provided by the combination of switches 428 which is connected to a column prime line 430 linking the read and write apertures of both cores 404 and 406 and which is connected through the switch 422 as shown, and switch 432 which has connected thereto a column read line 434 linking the read apertures of cores 402 and 406, as well as the aperture of core 412 of the variable portion of the array. The line 434 is terminated at a switch 436 which represents switch group 44 of FIGURE 1.

Column drive for the cores 408, 410, 412 and 414 is provided by the combination of a switch 438 which applies power to a column read line 440 linking the apertures of all of the cores 408, 410, 412 and 414 and which is terminated at a switch 442 which represents a portion of switch group 60 of FIGURE 1. The column write drive for the variable storage portion includes a switch 444, also included in switch group 58 of FIGURE 1, and which is connected to a column write line 446, similarly linking all of the apertures of the cores 408, 410, 412 and 414, but opposite in direction to that of line 440. Line 446 is terminated at a switch 448 which represents switch group 62 of FIGURE 1.

The row selection circuitry of FIGURE 4 further includes a switch 450 which is connected to a row prime line 452 linking the read apertures of the cores 400 and 402 as well as the apertures of cores 408 and 410 with respect to which the line 452 represents a row read line. The line 452 is then terminated at a switch 454 which represents switch group 52 of FIGURE 1. Switch group 46 also includes a second switch 456 which completes a circuit through a row read line 458 linking the read aperture of cores 400 and 402 as well as the aperture of core 408 with respect to which line 458 is a row write line. The line 458 is then terminated at a switch 472 which represents switch group 50 of FIGURE 1. The switch group 48 is shown to include a first switch 462 which is connected to a row prime line 464 linking the read apertures of cores 404 and 406 as well as the apertures of cores 412 and 414 with respect to which line 464 is a row read line. The line 464 is terminated at a switch 466 which represents switch group 56 of FIGURE 1. Switch group 48 also includes a switch 468 which is connected to a row read line 470 linking the read apertures of cores 404 and 406 as well as the aperture of core 410 where it serves the row write function. The line 470 is terminated at a switch 460 representative of switch group 54 of FIGURE 1. The switches in the groups shown in FIGURE 4 are connected to either the positive terminal of a direct current source or to a current regulator as suggested in FIGURE 1, but omitted fom FIGURE 3 for the sake of simplicity. Each of the switches is further connected to a combination of input lines carrying logically combined signals from the decoder 110 shown in FIGURE 1. These input signals are received from the decoder 110 for the purpose of energizing a particular combination of switches to perform prime and read operations in the fixed information cores and read and write operations in the variable information cores.

As a generalized example of the operation of the circuit shown in FIGURE 4, assume the incoming address at input 102 of FIGURE 1 requires the memory to divulge the contents of core 400 in the fixed portion of the memory. This is accomplished by providing input signals of a fixed duration to switches 416 and 422 which energize the column prime line 420 with a half-drive current. At the same time, the address must energize switches 450 and 454 to energize the row prime line 452 to provide another half-drive current. Energization of the row prime line 452 also provides half-drive read currents to the cores 408 and 410. However, since no column read current is provided to these cores they are not switched. After the core 400 is primed by the pulses of current through the switches, the address is then modified by the logic circuit of FIGURE 3 such that switches 418 and 426 are energized by input signals to direct the flow of current through column read line 424. Simultaneously, switches 456 and 472 are provided with energizing input signals to direct the flow of current through row read line 458. This completes the prime and read operations performed on core 400. If the core stores a "0," the flux conditions for the core throughout the operation are substantially as shown in FIGURE 2*a*. If the core stores a "1," the flux conditions are switched from that shown in FIGURE 2*b* to that of FIGURE 2*c* and back again. The informational value, either "0" or "1," is obtained in the form of the absence or presence of a voltage pulse on the particular sense line linking the core 400 and an amplified version of the pulse is delivered to the output system shown in FIGURE 1.

As previously suggested, operations in the variable portion 12 of the memory of FIGURE 1 are performed on four cores at a time; that is, one core from each of the two-dimensional arrays A, B, C and D. Accordingly, the cores 408, 410, 412 and 414 shown in FIGURE 4 may all be read out and written into at one time. The system is not limited to this performance, of course. This is accomplished by primarily energizing switches 438 and 442 which direct the flow of column read current through the column drive line 440. At the same time, switches 450 and 454 are energized to direct the flow of row read current through line 452 linking cores 408 and 410. Also coincident with this operation is the energization of switches 462 and 466 directing current through the row read line 464, linking cores 412 and 414. At this point, the flux pattern is switched in each of the cores 408, 410, 412 and 414 which contains a "1." Those cores containing a "0" are, of course, not switched but remain in the "0" condition. The address is then modified slightly to write a "1" back into those cores where a "1" is desired. The information written into the variable portion 12 may be brought up to date by the introduction of new information on the DRO input lines 114 of FIGURE 1, or the old information may be restored. The write operation is accomplished by providing column drive current by energizing switches 444 and 448 to direct column write current through line 446 linking all of the variable information cores 408, 410, 412 and 414. Assuming it is desired to write a "1" into all of the variable information cores, switches 456 and 472 are switched to direct current through line 458 linking the A core 408. Similarly, switch pairs 468 and 460, 432 and 436, and 418 and 426 are energized to direct row read currents through write lines 470, 434 and 424 linking cores 410, 412 and 414, respectively. By this coincidence of column write and row write currents in each of the variable information cores, a "1" is written into each. Of course, any combination of "1's" or "0's" can be written.

The operation described above directs both column and row read currents through the cores in the fixed information portion. However, since the write lines in the variable portion which are common to the fixed portion are read lines in the fixed portion, only read currents are provided through the fixed information cores. Since none of the fixed information cores was primed prior to the read-write operation in the variable portion, none of the fixed information cores is either primed or read.

FIGURE 5

Figure 5:
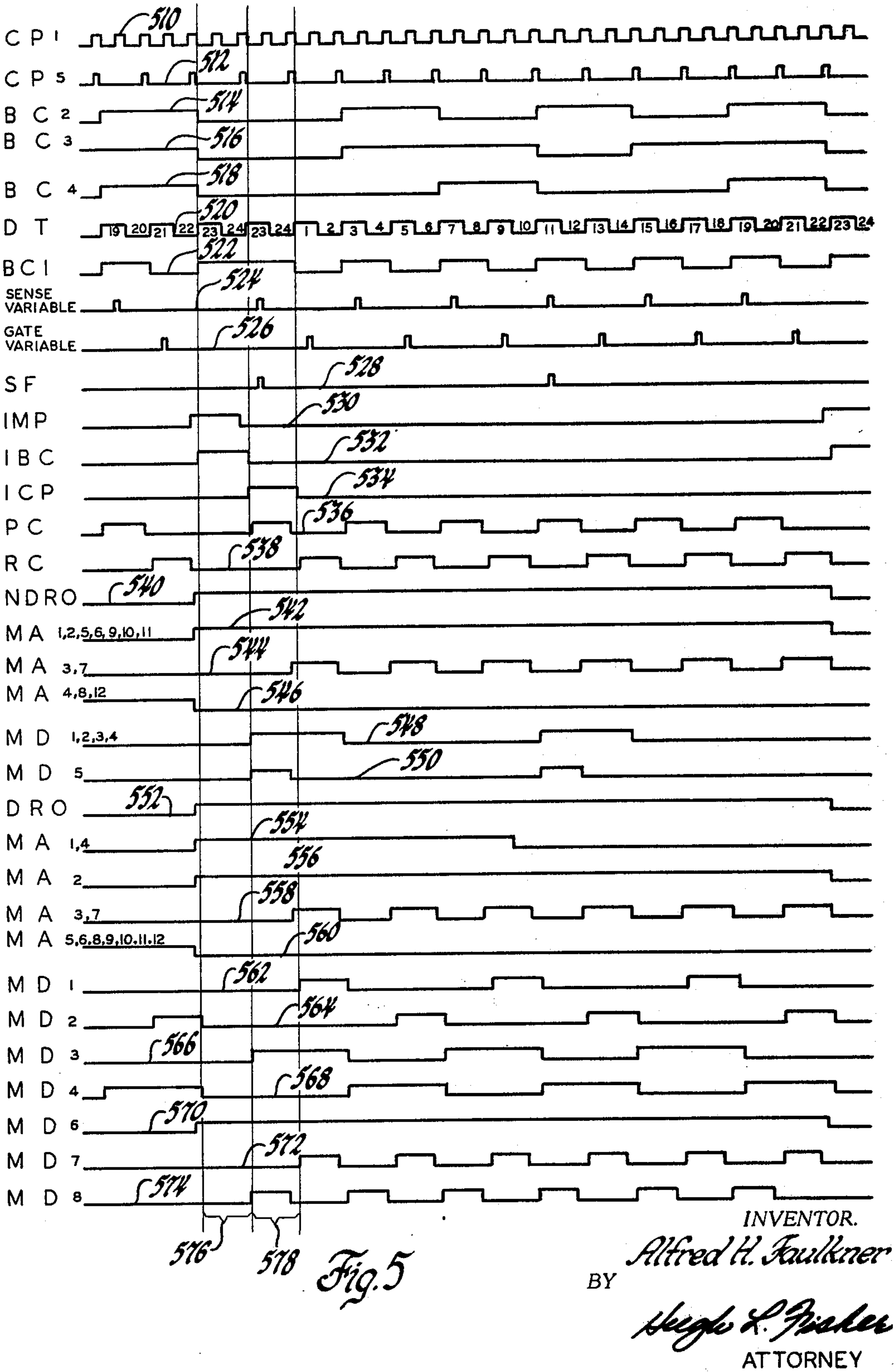
FIGURE 5 is a diagram of illustrative waveforms indicating the time relationship therebetween for a typical operation of the memory system shown in FIGURES 1 through 4.

FIGURE 5 shows thirty-two waveforms which are illustrative of an exemplary operation of the specific embodiment of the memory system presented herein. The waveforms may be categorized into five classes. The first class includes those signals that are present whether or not the memory is being used; the second includes those that may be present only if the memory is used; the third, those which may be present only if the NDRO portion 10 is used; and the fourth, only if the DRO portion 12 is used. The fifth group of signals includes those that synchronize the operation of the external computer with those of the memories and the operation of the NDRO memory portion 10 to the DRO memory portion 12.

The first group, those which are present whether or not either portion 10 or 12 is used, includes clock pulses 510 (CP1) and 512 (CP5) and digit time pulses 520. The second group, those that may be present only if the memory arrays are used, include bit counter pulses (BC2) 514, (BC3) 516 and (BC4) 518; bit counter (BC1) pulses 522; prime current (PC) pulses 536; and read current (RC) pulses 538. Also in this second group are the sense variable memory (SV) pulses 524, gate variable secondary (SGV) pulses 526, and a sense fixed memory (SF) pulses 528.

The third group of signals, those that may be present only if the NDRO memory is being used, includes NDRO pulse 540; memory address (MA) bits 1, 2, 4, 5, 6, 8, 9, 10, 11 and 12, which do not change during a word time but are shown in two groups 542 and 546, depending on their state; memory address (MA) bits 3 and 7 which change at even digit times during a word as shown at 544; and also in this group are memory driver (MD) pulses 1, 2, 3, 4 and 5, as shown at 548 and 550.

The fourth group of signals, those which may be present only if the DRO array is being used, includes DRO pulse 552, memory address (MA) bits 2, 5, 6, 8, 9, 10, 11 and 12, which do not change during a word and are shown in two groups 556 and 560, depending on their state in the example given with reference to FIGURE 4; memory address (MA) bits 1 and 4 which, at digit time 10 are changed to the complementary state; and memory address (MA) bits 3 and 7, which change every even bit time during a word as shown at 558. Also in this group of signals are memory driver pulses 1 through 4 and 6 through 8 shown at 562, 564, 566, 568, 570, 572 and 574.

The fifth group of signals are those used for synchronizing the external computer to the memory arrays and the arrays to each other. These pulses include the inhibit memory drive (IMD) pulse 530, the inhibit bit counter (IBC) pulse 532, and inhibit counter (ICP) pulse 534. When the inhibit memory driver (IMD) pulse 530 goes up at the end of each digit time 22, the memory driver currents MD5, 7 and 8 are cut off to switches on one side of all the column selection lines, thereby preventing the use of either memory array. This effects a complete suspension of memory operations during the time period 576 indicated in FIGURE 5. Another effect of the rise of the IMD pulse 530 is to permit the use of the inhibit bit counter (IBC) pulse 522 at the digit time 23. The IBC pulse prevents clock signals BC2, BC3, BC4, and BC1 from changing. Then, when the inhibit memory drive (IMD) pulse 530 falls, the inhibit bit counter (IBC) pulse 532 also falls at the beginning of the second of the digit times 23 to permit the bit clock and digit clocks to resume their operation. However, the falling of the IBC pulse 532 also causes inhibit computer (ICP) pulse 534 to rise. This suspends computer operations external to the memory during the time period 578 which exists until the ICP pulse 534 falls at the beginning of BC1.

OPERATION

A description of the operation of the logic circuit of FIGURE 3 is given in the following with reference to the waveforms of FIGURE 5. Referring to FIGURE 3, address bits 1, 3, 4 and 7 are initially supplied to the AND circuits 310, 312, 314 and 316 from the address buffer register 104 by way of outputs 300, 302, 304 and 306, respectively. Each of these bits is connected to related memory address register units 338, 340, 342 and 344.

The timing and control unit 100 provides pulses to gates 310, 312, 314 and 316 on lines 318 during DT22. When DT23 begins, the timing and control unit 100 provides pulses to gates 334 and 330 on line 336. At every even digit time DTE, pulses are provided to one input of the second rank registers 356, 358, 360 and 362 via line 380. Similarly, at every tenth digit time DT10, the timing and control unit 100 provides a pulse to gates 328 and 332 via line 337.

The address toggling operation begins at the end of the second digit time 24 of a preceding word-time when all address bits are gated from the buffer register 106 to the memory address registers 108 by control signals appearing at register inputs 382, 384, 386, 388. At the first even digit time (DTE) after DT22, the address bits 1, 3, 4 and 7 are gated into the second rank registers 356, 358, 360 and 362 and from there to the input of gating circuits 328, 330, 332 and 334. Bits 3 and 7 are toggled every even digit time when timing signals at inputs 384 and 388 gate the input side of the memory address registers 340 and 344. However, bits 1 and 4 are toggled only during a DRO operation and then only at digit time 10.

With the address buffer bit 7 initially up, output 306 is high, and since gate 316 is an inverting AND gate, the output to OR gate 326 is down. The OR circuit 326 inverts the signal again so that the input applied to inverter 352 is up and the output thereof as applied to the memory address register 344 is down. When register 344 is gated by a timing signal at 388, its output assumes the state of the input from gate 326.

At the next even digit time (DTE), the output of second rank register 362 on line 370, as applied to gate 334, is down. Then, since digit time twenty-three (DT23) does not occur until the end of the word time, the input on line 336 to gate circuit 334 is also down so that the resulting output from circuit 334 is up. This output, after inversion by OR circuit 326, becomes a down input to memory address register unit 344, which during the next digit time is gated by timing signal at input 388. This toggles the output of unit 344 such that the two output lines are complemented, and thereby completes the change of state of bit 7.

The processing of bit 3 is identical to that described for bit 7 above, and therefore is not detailed for the sake of simplicity. Bits 1 and 4 are also processed in a manner similar to that for bits 3 and 7 above except that the gating signal at the inputs 386 and 382 of the memory address registers 342 and 338 is complementary to that at 384 and 388, and that the inputs to gates 324 and 320 can be up only at two discrete times of the word cycle: at digit time 22 and half way through the word time at digit 10. Hence bits 1 and 4 can be altered only once during each word time.

Referring now to FIGURE 4, specific examples of both a fixed portion selection and a variable portion selection will be described. The particular address for the examples are shown in the address block to the lower left of the figure. In describing the operations, reference will also be taken to the waveforms of FIGURE 5.

With the specific NDRO address 011100110011 representing bits 12 through 1 respectively at the end of DT22 and with these bits applied to the current switches of FIGURE 4, through the register and decoder circuits, NDRO operations commence with the priming of core 404 at $DT23 \cdot ICP$ of time period 578. During ICP, reference to FIGURE 5 shows that the MD2, MD4, MD5 and PC pulses are up. MD2 allows switch 416 to conduct and MD5 allows switch 422 to conduct, thus, providing cores 400 and 404 with one unit of prime current through line 420. Similarly, MD4 allows switch 462 to conduct and PC allows switch 466 to conduct, thus, steering the second unit of prime current through selection lines 464 to core 404 only. At $DT1+DT2$, the PC and MD5 pulses fall, RC and the MA3 and MA7 bits come up, and the MD2 and MD4 pulses stay up. With bit 3 thus toggled, MD2 now allows switch 418 to conduct and RC allows switch 426 to conduct, thus, steering the first unit of read current through selection line 424 to cores 400 and 404. With bit 7 similarly toggled, MD4 allows switch 456 to conduct, and RC allows switch 460 to conduct. This steers the second unit of read current through line 458 to core 404 only, thus, completing the first prime-read cycle for NDRO core 404. It should be noted that while the PC and RC pulses continue to rise and fall, MD1, MD2, MD3, MD4 and MD5, by not rising again until DT11, prevent NDRO operation until then.

A specific example of DRO operation will now be given with the specific DRO address of 000000001011 representing bits 12 through 1 respectively. This address occurs at the end of DT22 of the previous word time and with these bits applied to the current switches as described previously, DRO operations commence at $DT23 \cdot ICP$ with the reading of DRO cores 408, 410, 412 and 414. At this time, MD4, MD6, MD8 and PC are all up. MD6 allows switch 438 to conduct and MD8 allows switch 442 to conduct, thus, steering one unit of read current through selection line 440 to the column of four cores. Simultaneously, MD4 allows switches 450 and 462 to conduct and PC allows switches 454 and 466 to conduct, thus, providing the second unit of read current through selection lines 452 and 464 respectively.

At the beginning of DT1, the PC and MD8 pulses both fall, cutting off both units of read current to the DRO cores. However, MA3 and MA7 bits are now toggled to be up; the RC MD2 and MD7 pulses are also now up; the MD4, MD6 remains up, and BC3 and BC4 pulses remain down. The MD6 along with the toggled MA3 bit and also the BC3 and BC4 pulses allow switch 444 to conduct through selection line 446 to switch 448, which is allowed to conduct by the MD7 pulse. Thus, one unit of write current is provided to each DRO core in the column.

The second unit of write current is provided individually for each core depending on the presence of a write pulse WA, WB, WC and WD to corresponding switches 472, 460, 436 and 426. Assuming that only WA and WC are present, it is seen that these signals, together with DRO address bits 1 and 2 and also the RC pulse, allow switch 472 and switch 436 to conduct provided that the switches at the other end of the selection lines 470 and 434 respectively are also permitted to conduct. The latter is accomplished since MD4 and the toggled DRO address bit 7 allow switch 468 to conduct while MD2 and again the toggled DRO address bit 7 allow switch 432 to conduct. Thus, assuming that only WA and WC and not WB or WD are provided by the timing and control unit, a "1" is written only into DRO cores 408 and 412. Should WB be provided, it can be similarly shown that a "1" would be written into DRO core 410 via selection line 458, due to the conduction of switches 486 and 460. Also, a "1" could have been written into DRO core 414 via selection line 424 due to the conduction of switches 422 and 426 provided, of course, that a WD pulse had been provided.

It is to be understood that the specific embodiment described above is not to be construed in a limiting sense. For a definition of the invention, reference should be made to the appended claims.

What is claimed is:

1. A coincident current memory system having a fixed information portion comprising a two-dimensional array of first magnetic storage elements containing digital information which may be nondestructively read therefrom, and a variable information portion comprising a two-dimensional array of second magnetic storage elements containing digital information which may be destructively read therefrom, a plurality of first column selection lines linking respective columns of the first magnetic storage elements, a plurality of second column selection lines linking respective columns of the second magnetic storage elements, a plurality of row selection lines commonly linking respective rows of the first and second magnetic storage elements, means for receiving an address for access to the memory arrays, means for decoding the address and for coincidently energizing a combination of row and column selection lines in one of the arrays to determine the contents of the element commonly linked by the coincidently energized lines.

2. A coincident current memory system comprising a fixed information storage portion and a variable information storage portion, the fixed information portion comprising a two-dimensional array of first magnetic storage elements containing digital information which may be nondestructively read by a sequence of first and second pairs of coincident signals, the variable information portion comprising a two-dimensional array of second magnetic storage elements containing digital information which may be destructively read by a third pair of coincident signals, first and second pluralities of column selection lines linking respective columns of the first magnetic storage elements for supplying one signal of the first and second pairs of coincident signals, respectively, thereto, a third plurality of column selection lines linking respective columns of the second magnetic storage elements for supplying one signal of the third pair of coincident signals thereto, a first plurality of row selection lines linking respective rows of the first and second magnetic storage elements for supplying the other of the first and third pairs of coincident signals, respectively, thereto, a second plurality of row selection lines linking respective rows of the first magnetic storage elements for supplying the other of the second pair of coincident signals thereto, means for receiving an address for access to the fixed and variable information portions, means for decoding the address and for energizing said selection lines to read information from the portion addressed.

3. A coincident current memory system comprising a fixed information portion and a variable information portion, the fixed information portion comprising a two-dimensional array of first magnetic storage elements containing digital information which may be nondestructively read by a sequence of first and second pairs of coincident signals, the variable information portion comprising a two-dimensional array of second magnetic storage elements containing digital information which may be destructively read by a third pair of coincident signals, and restored by a fourth pair of coincident signals, first and second pluralities of column selection lines linking respective columns of the first magnetic storage elements for supplying one signal of the first and second pairs of coincident signals, respectively, thereto, third and fourth pluralities of column selection lines linking respective columns of the second magnetic storage elements for supplying one signal of the third and fourth pairs of coincident signals, respectively, thereto, a first plurality of row selection lines linking respective rows of the first and second magnetic storage elements for supplyng the other of the first and third pairs of coincident signals, respectively, thereto, a second plurality of row selection lines linking respective rows of the first and second magnetic storage elements for supplying the other of the second and fourth pairs of coincident signals, respectively, thereto, means for receiving an address for access to the fixed and variable information portions, and means connected to said means and said selection lines for decoding the address and for energizing said lines in a sequence dependent upon said address.

4. A coincident current memory system comprising a fixed information portion and a variable information portion, the fixed information portion comprising a two-dimensional array of first multi-aperture magnetic core elements of high magnetic remanence each having a read and a write aperture and containing digital information which may be nondestructively read by a sequence of first and second pairs of coincident signals of opposite magnetic effect, the variable information portion comprising a two-dimensional array of second magnetic core elements of high magnetic remanence each having a read aperture and containing digital information which may be destructively read by a third pair of coincident signals, first and second pluralities of column selection lines linking the read apertures of respective columns of first core elements for supplying one signal of each of the first and second pairs of coincident signals, respectively, thereto, a third plurality of column selection lines linking the read apertures of respective columns of the second core elements for supplying one signal of the third pair of coincident signals thereto, a first plurality of row selection lines linking the read apertures of respective rows of the first and second core elements for supplying one of the first and third pairs of coincident signals, respectively, thereto, a second plurality of row selection lines linking the read apertures of respective rows of the first core elements for supplying the other of the second pair of coincident signals thereto, first and second output windings linking the read apertures of the first and second core elements respectively, means for receiving an address for access to the fixed and variable portions and means connecting said means and the selection lines for energizing certain of the lines in accordance with the nature of the address.

5. A coincident current memory system as defined in claim 4 wherein each of the first plurality of column selection lines links both the read and write aperture of each of the first core elements in the column linked thereby.

6. A coincident current memory system as defined in claim 4 including bias windings linking the read aperture of each of the first core elements and a source of direct current connected to the windings for supplying a bias signal to the core elements which magnetically opposes the first pair of coincident signals and aids the second pair of coincident signals.

7. A coincident current memory system comprising a fixed information storage portion and a variable information storage portion, the fixed information portion comprising a two-dimensional array of first magnetic storage elements containing digital information which may be nondestructively read by a sequence of first and second pairs of coincident signals, the variable information portion comprising a two-dimensional array of second magnetic storage elements containing digital information which may be destructively read by a third pair of coincident signals, first and second pluralities of column selection lines mutually linking respective columns of the first magnetic storage elements for supplying one signal of the first and second pairs of coincident signals, respectively, thereto, a third plurality of column selection lines linking respective columns of the second magnetic storage elements for supplying one signal of the third pair of coincident signals thereto, a first plurality of row selection lines linking respective rows of the first and second magnetic storage elements for supplying the other of the first and third pairs of coincident signals, respectively, thereto, a second plurality of row selection lines linking respective rows of the first magnetic storage elements for supplying the other of the second pair of coincident signals thereto, a source of electrical energy, a plurality of switch means connecting the source with the column and row selection lines for energization thereof, means for receiving a digital address for access to the fixed and variable storage portions, means for decoding the address and for operating combinations of the switch means corresponding to the address, and logic means connected to the decoding means for energizing a column selection line of said second plurality of column selection lines and a row selection line of the second plurality of row selection lines following energization of the column and row selection line of the first pluralities of column and row selection lines linking the same column and row of storage elements respectively.

8. A coincident current memory system comprising a fixed information portion and a variable information portion, the fixed information portion comprising a two-dimensional array of first multi-aperture magnetic core elements each having a read and a write aperture and containing digital information which may be nondestructively read by a sequence of first and second pairs of coincident signals of opposite magnetic effect, the variable information portion comprising a two-dimensional array of second magnetic core elements each having a read aperture and containing digital information which may be destructively read by a third pair of coincident signals, a pluraltiy of first column selection lines linking the read apertures of respective columns of first core elements for supplying one of the first pair of coincident signals thereto, a plurality of second column selection lines linking the read apertures of respective columns of first core elements for supplying one of the second pair of coincident signals thereto, a plurality of third column selection lines linking the read apertures of respective columns of the second core elements for supplying one of the third pair of coincident signals thereto, a plurality of first row selection lines linking the read apertures of respective rows of the first core elements for supplying the other of the second pair of coincident signals thereto, a plurality of second row selection lines linking the read apertures of respective rows of the first and second core elements for supplying the other of the first and third pairs of coincident signals, respectively, thereto, first and second output windings linking the read apertures of the first and second core elements respectively, a source of direct current, a plurality of switch means individually connecting the source to the row and column selection lines and responsive to input signals to admit current from the sources to the selection lines, decoding means connected to the switch means and responsive to digital address of a first character to coincidently supply input signals for a fixed period to the switch means connected to one of the plurality of first column selection lines and one of the plurality of second row selection lines, and logic means connected to the switch means and responsive to the actuation of the address-selected switch means to, at the end of said fixed period, coincidently supply input signals to the switch means connected to one of the plurality of the second column selection lines and one of the plurality of first row selection lines for a fixed period.

9. A coincident current memory system as defined in claim 8 including bias windings linking the read apertures of each of the first core elements, and a source of direct current connected to the windings for supplying a bias signal to the first core elements which magnetically opposes the first pair of coincident signals and aids the second pair of coincident signals.

10. A coincident current memory system comprising a fixed information storage portion and a variable information storage portion, the fixed information portion comprising a plurality of two-dimensional arrays of first magnetic core elements containing digital information which may be nondestructively read by a sequence of first and second pairs of coincident currents, the variable information portion comprising a two-dimensional array of second magnetic core elements containing digital information which may be destructively read by a third pair of coincident currents, a first plurality of column selection lines linking respective columns of first core elements in each of the plurality of two-dimensional arrays for supplying one of the first pair of currents to the columns of core elements, a second plurality of column selection lines linking respective columns of first core elements in each of the plurality of two-dimensional arrays for supplying one of the second pair of currents to the columns of core elements, a third plurality of column selection lines linking respective columns of second core elements for supplying one of the third pair of currents to the elements, a first plurality of row selection lines linking respective rows of first core elements in each of the two-dimensional arrays for supplying the other of the second pair of currents thereto, a second plurality of row selection lines linking respective rows of first core elements in each of the two-dimensional arrays and also respective rows of second core elements for supplying the other of the first and third pairs of currents thereto, a source of direct current, a plurality of switch means connected to the row and column selection lines and responsive to input signals to direct current from the source through the associated lines, decoding means for receiving a digital address and for applying input signals coincidently to a pair of said switch means thereby to energize a row and column selection line, a plurality of first output lines each linking the first core elements of one of the two-dimensional arrays of the fixed information portion for producing output signals corresponding to the digital information read from the core elements in each array, and a second output line linking the second core elements of the variable information portion.

References Cited

UNITED STATES PATENTS

| | | | |
|---|---|---|---|
| 3,248,708 | 4/1966 | Hayes | 340—72.5 |
| 3,242,467 | 3/1966 | Lamy | 340—72.5 |
| 3,237,172 | 2/1966 | Gosslav et al. | 340—174 |
| 3,196,413 | 7/1965 | Teig | 340—174 |

JAMES W. MOFFITT, Primary Examiner

U.S. Cl. X.R.

340—172.5